Oct. 12, 1965         G. L. PETERSEN         3,211,485
               QUICK CONNECTING MEANS FOR SHAFTS
Filed March 26, 1963                        2 Sheets-Sheet 1
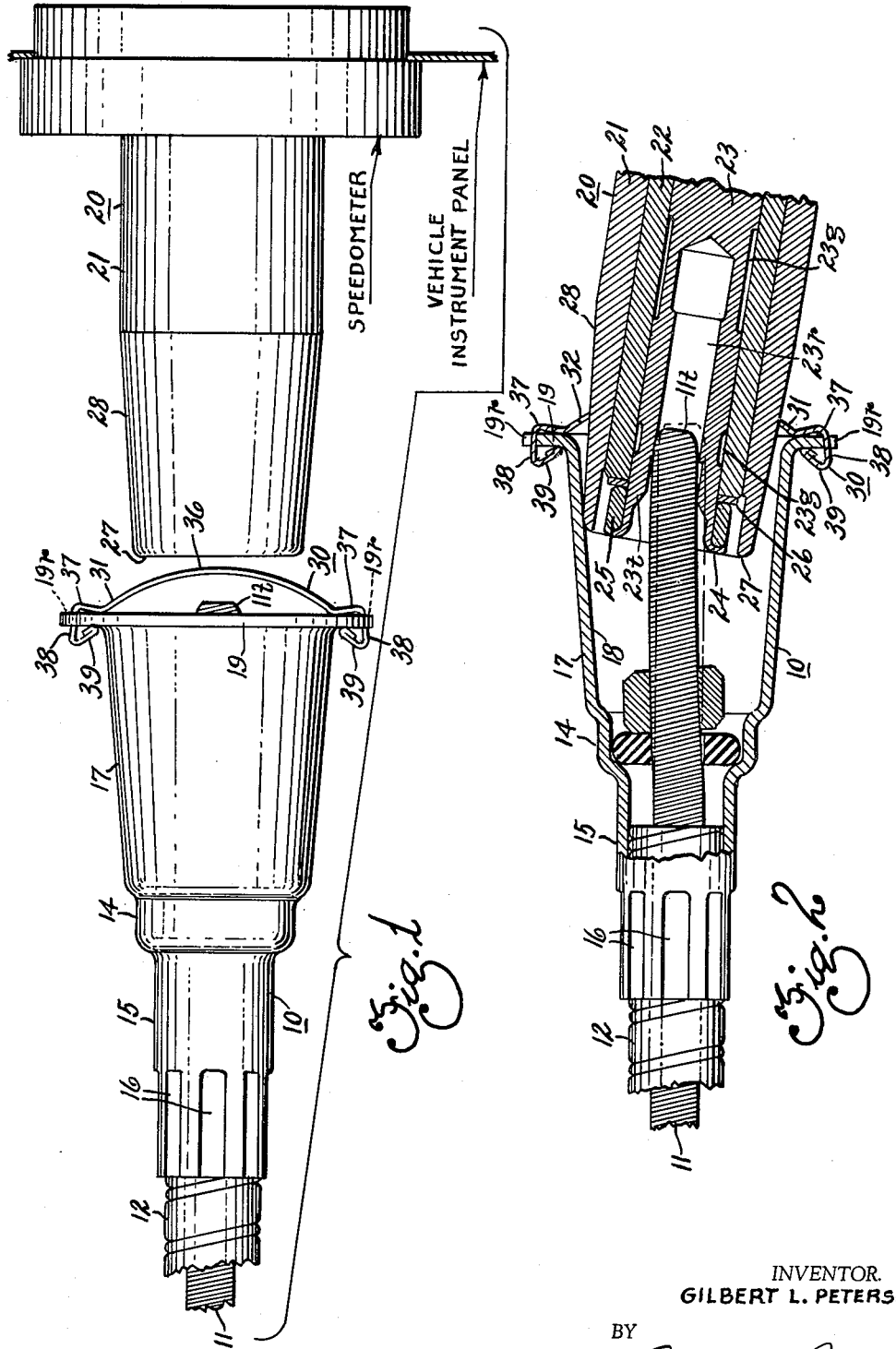
INVENTOR.
GILBERT L. PETERSEN
BY
Albert H. Reuther
HIS ATTORNEY

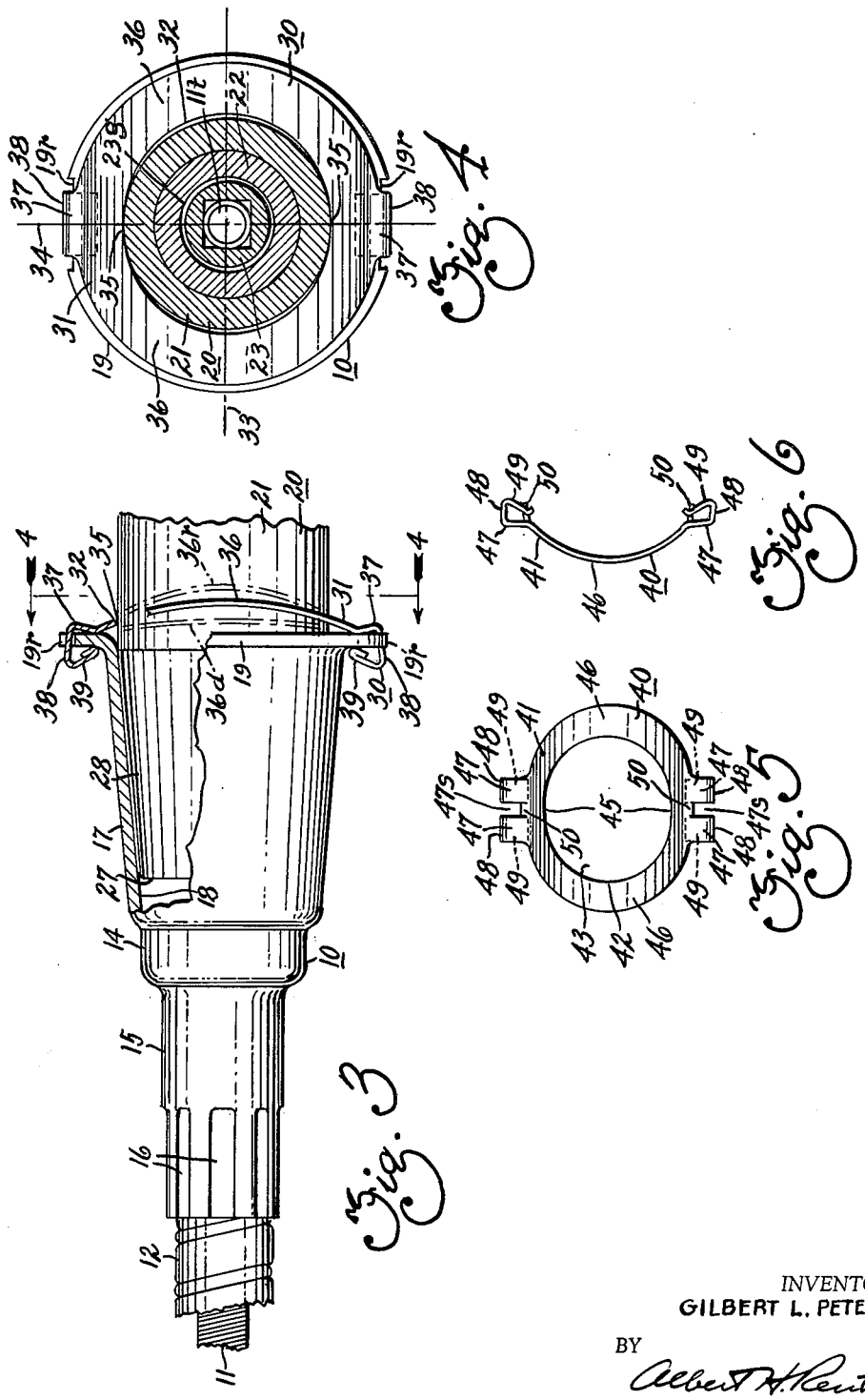

United States Patent Office 3,211,485
Patented Oct. 12, 1965

3,211,485
QUICK CONNECTING MEANS FOR SHAFTS
Gilbert L. Petersen, Flint, Mich., assignor to General Motors Corporation, Detroit, Mich., a corporation of Delaware
Filed Mar. 26, 1963, Ser. No. 268,054
1 Claim. (Cl. 287—126)

This invention relates to a flexible shaft connector means and, more particularly, to a quick connection between a flexible shaft means and an instrument or other driven assembly.

An object of this invention is to provide a new and improved connection between a flexible shaft and driven instrument means such as a vehicle speedometer permitting rapid assembly and disassembly as to each other yet obtaining a properly aligned and tight holding interfit of components protected against possible damage by severe bending during assembly, disassembly, handling, shipping and the like.

Another object of this invention is to provide an interconnection between an end of a flexible shaft having a tapered configuration to match a corresponding taper of a driven assembly combined with a unitary spring clip means arced as anchored to the driven assembly and thereby flexed centrally to provide a minor diameter of an aperture centrally therethrough to be less than diameter of mating housing portions which are tightly held to each other regardless of relative longitudinal positioning therebetween yet maintaining a minimum possible misalignment such that interfit of mating tapered cable-drive portions can be protected against damage by severe bending, handling, shipping and the like.

Another object of this invention is to provide a speedometer assembly having flexible shaft quick connector components including concentric sleeve means having an inner portion to be rotatably driven from an axially recessed end thereof located radially inwardly of a male housing portion tapered to correspond in mating engagement with a ferrule-like cable housing end portion having an outwardly extending end flange recessed radially inwardly in at least a pair of substantially opposite locations to permit snap fit engagement of corresponding anchoring tab portions integral with a washer-like spring clip means having a centrally apertured substantially annular main body portion which flexes centrally to provide a minor diameter of the aperture to have peripheral edging thereof tightly engageable for interlock with the tapered male housing portion resiliently restricted as to possible misalignment as to each other yet subject to quick release only by temporary application of flattening pressure to the main body portion of the washer-like spring clip means for reduction of arcing thereof to overcome and reduce resilient maintenance of the minor diameter for release of interlock of components to each other regardless of relative longitudinal positioning therebetween though protected against damage by severe bending, handling, shipping and the like.

A further object of this invention is to provide a washer-like spring clip means having a centrally apertured substantially annular main body portion which is flexed to be bowed in substantially diametrically opposite locations into an ellipse-like configuration including an inner peripheral edging having a minor diameter of the aperture aligned with integral anchoring outward projections which have an axially extending portion and a back-bend inwardly extending end portion to hold the clip means to a female housing portion of a connector assembly to receive a male housing portion tapered inwardly along an outer-end surfacing thereof to mate with the corresponding housing portion properly aligned and tightly held together by only the washer-like spring clip means subject to quick release by temporary application of flattening pressure to the main body portion for reduction of bowed condition thereof in substantially diametrically opposite locations to overcome at least in part and reduce resilient maintenance of the minor diameter regardless of relative longitudinal positioning therebetween though protected against damage by severe bending, handling, shipping and the like.

Another object of this invention is to provide in combination a unitary washer-like spring clip means and speedometer assembly having flexible shaft quick connector components including concentric sleeve means having an inner portion to be rotatably driven from an axially recessed end thereof located radially of a male housing portion tapered to correspond in mating engagement with a ferrule-like cable housing end portion having an outwardly extending end flange recessed radially inwardly in at least a pair of substantially opposite locations to permit anchoring engagement of correspondingly located substantially J-shaped axially projecting portions integral with the washer-like spring clip means having a centrally apertured substantially annular main body portion which flexes centrally to provide a minor diameter of the aperture to have peripheral edging thereof tightly engageable for press fitted interlock with the tapered male housing portion resiliently restricted as to possible misalignment as to each other yet subject to quick release only by temporary application of flattening pressure to the main body portion of the washer-like spring clip means for reduction of arcing thereof to overcome and reduce maintenance of minor diameter for release of interlock of components to each other regardless of relative longitudinal positioning therebetween though protected against damage by sever bending, handling, shipping and the like.

Further objects and advantages of the present invention will be apparent from the following description, reference being had to the accompanying drawings wherein preferred embodiments of the present invention are clearly shown.

In the drawings:

FIGURE 1 is an exploded elevational view of connector components having features in accordance with the present invention.

FIGURE 2 is a cross-sectional view showing components of FIGURE 1 and representing initiation of interfit thereof to each other.

FIGURE 3 is a partially sectioned view of components fully assembled to each other and including phantom showings of positioning of washer-like spring clip means without interfit of components as well as for quick release thereof in accordance with the present invention.

FIGURE 4 is a cross-sectional view taken along line 4—4 in FIGURE 3.

FIGURE 5 is a plan view of another washer-like spring clip means for use in accordance with the present invention.

FIGURE 6 is a side view of the clip means of FIGURE 5.

Due to limited access space behind vehicle instrument or dashboard panels and the like, there is often considerable difficulty in aligning as well as threading coupling parts to each other for holding a flexible cable or shaft means in position as to an instrument housing driving connection such as on a speedometer means. To avoid possible damage to the instrument as well as the flexible cable or shaft means, considerable effort is required together with a loss of time which can be minimized now by provision of features in accordance with the present invention.

FIGURE 1 illustrates a flexible shaft means generally indicated by a numeral 10 which has a flexible cable portion 11 substantially concentrically surrounded by a sheath or armored shielding portion 12 of metal and the like. The flexible cable 11 terminates in a tapered end portion 11*t* which can be seen in views of FIGURES 1 and 2. Surrounding this end of the cable or flexible shaft means there is provided a ferrule-like cable housing end portion 14 which includes an integral, reduced diameter segment 15 fitted coaxially around the sheath or shielding portion 12 and secured thereto by longitudinal crimping represented by reference numeral 16 in FIGURES 1, 2 and 3 of the drawings. The housing portion 14 also has an integral bell-like portion 17 with an inner outwardly tapering surface 18 terminating in an outwardly extending end flange means 19 recessed radially inwardly as indicated by references 19*r* in at least a pair of substantially diametrically opposite locations as can be seen in views of FIGURES 1 through 4 of the drawings.

Views of FIGURES 1 through 4 of the drawings also show a speedometer or instrument driving portion generally indicated by numeral 20 including a first or outer sleeve means 21 located concentrically around a second or inner sleeve means 22 as best seen in views of FIGURES 2 and 4. Located radially inwardly and concentrically from these inner and outer sleeves 21 and 22 there is a rotatably driven shaft-like member 23 with lubricant-retaining grooves 23*g* along an outer periphery of a tubular extension 23*t* of the portion 23 thus having a hollow or axially recessed end 23*r* into which the tapered end 11*t* of the driving cable or member 11 is fitted. Resilient engagement and interfit of the tapered end 11*t* to an inner periphery of the tubular end 23*t* can be accomplished by a press fitting regardless of perfect axial or longitudinal alignment of telescopic members. As can be seen in the view of FIGURE 2, the tubular end 23*t* terminates in an outwardly flared flange portion 24 bent axially rearwardly to retain an annular sleeve-like bearing means 25 located concentrically around the tubular portion 23*t* and abutting against a thrust washer or centrally apertured plate 26. The outer sleeve portion 21 has an end 27 terminating substantially in radial alignment with the flange portion 24. The outer sleeve portion 21 also includes an inwardly tapering outer surface 28 adapted to mate telescopically with a minimum of longitudinal misalignment by insertion of the male housing portion 20 relative to the bell-like portion 17 having the tapered inner periphery or surfacing 18 complementary thereto as indicated particularly in FIGURE 3 of the drawings.

A quick connection between the flexible shaft means and the instrument or other driven assembly can be accomplished by telescopically interfitting these mating parts subject to interlock by a unitary spring clip or connector means generally indicated by numeral 30 in views of FIGURES 1 through 4 of the drawings. This unitary spring clip means includes an initially substantially annular main body portion 31 centrally apertured to have an inner peripheral edging 32 having a major diameter 33 as well as a minor diameter 34 as can be best seen in the view of FIGURE 4. Along the minor diameter 34 there is a resiliently maintained frictional interfit of the inner peripheral edging 32 specifically along outer periphery of the primary sleeve portion 21 in curved locations 35 substantially diametrically opposite to each other. The minor diameter of the unitary spring clip means 30 is formed due to opposite central arcing or bowing of intermediate portions 36 of the main body portion 31. The view of FIGURE 1 and a phantom representation 36*r* in FIGURE 3 of the drawings represents released positioning of the spring clip means 30. A deformed or depressed positioning 36*d* of the arced or bowed portions 36 is also represented in phantom in FIGURE 3 in a location to the left of the bowed or arced portion 36 visible in that view. This released positioning 36*r* and the depressed positioning 36*d* are on opposite sides of the interfit positioning represented in FIGURE 3. So long as the arced or bowed portions 36 remain in the intermediate or interlocking positions, the minor diameter dimension between the peripheral edging 32 at diametrically opposite locations assures resilient maintenance of interfit in substantially aligned relationship for the mating male housing portion 20 and female housing portion 10. The spring clip means 30 is illustrated in views of FIGURES 1 through 4 as being anchored to the female housing portion 10 particularly as to the outwardly extending flange 19 due to interfit and interlock of anchoring tab portions 37 extending radially outwardly from the main annular body portion 31 of the spring clip means and including an axially extending segment 38 integral therewith terminating in a back-bend J-shaped end 39 which resiliently engages one side of the outwardly extending flange portion 19 integral with the female housing portion 10. The axially extending segments 38 are fitted into the radial recessing 19*r* of the flange portion 19 such that the spring clip means 30 in combination therewith is prevented from rotating about a common axis longitudinally of the assembled mating portions. The J-shaped interlocking ends 39 anchor the spring clip means 30 against longitudinal displacement relative to either of the housing portions subject to temporary deformation and depressing of the arced or bowed semi-annular portions 36 for quick disconnect or disassembly of the mating male and female housing portions relative to each other. A suitable tool or pressure of a pair of fingers can accomplish temporary depression or deformation of the bowed or arced portions 36 toward the flange 19 whereby instantaneously there is an increase in the minor diameter dimension to cause the curved portions 35 of the inner peripheral edging 32 to spread away from each other toward what would be a normal full diameter of the centrally apertured main body portion 31 so as to permit release of resilient interlocking and interfit of the edging 32 at diametrically opposite locations 35 whereby the male housing portion 20 can be readily disassembled from the female housing portion 10. Use of the spring clip means 30 in combination with the mating male and female housing portions 10 and 20 assures maintenance of resilient interfit while providing resilient restriction as to possible misalignment of the mating parts as to each other yet subject to quick release only by temporary application of flattening pressure to the arced or bowed portions 36 of the main body 31 of the washer-like spring clip means 30. This resilient reduction of arcing to overcome and reduce resilient maintenance of minor diameter for release of interlock of components such as the housing portions 10 and 20 to each other can occur regardless of relative longitudinal positioning therebetween though the mating ends of the cable 11 and driven shaft-like member 23 of an instrument or speedometer means are protected at all times against damage by severe bending, handling, shipping and the like. It is apparent that the tapered end 11*t* of the cable 11 is maintained substantially centrally of the female housing portion 10 and the axially recessed end of the mating shaft-like central portion 23 is also protected by inner and outer sleeve portions 21 and 22. A snap fit engagement of corresponding anchoring tab portions integral with the washer-like spring clip means assures retention thereof as to the outwardly extending flange of the female housing portion 10.

For added resilience and enhanced anchoring of such spring clip means, there can be a modified structure thereof as represented in views of FIGURES 5 and 6 of the drawings. In this embodiment the spring clip means generally indicated by numeral 40 includes an annular body portion 41 as well as peripheral inner edging 42 defined by an opening or aperture 43 centrally thereof such that in locations 45 substantially diametrically opposite to each other there is a minor diameter due to provision of intermediate bowed or arced portions 46. Pairs of anchoring tab portions 47 extend radially outwardly spaced from each other by a slot 47s therebetween as can be seen in FIGURE 5. Integral with each of the tab portions 47 there are longitudinally or axially extending segments 48 which terminate in a backbend or J-shaped inward anchoring end 49 visible in views of FIGURES 5 and 6 of the drawings. This end 49 as well as an axial projection or probe means 50 of metal integral with the main body portion 41 can engage opposite sides of a flange such as 19 in an assembly of components in accordance with the present invention. It is to be noted that the projection or probe means 50 is located in alignment with the slots 47s and can be formed of metal cut or displaced from between the anchoring tab portions 47.

All need for any threads on mating housing portions as well as any coupling components in combination therewith can be eliminated by provision of the unitary spring clip means 30 or 40 in accordance with the present invention. The central aperture or hole through the washer-like spring clip means is substantially circular when the bowed portions are flattened to be coplanar or substantially coplanar with the main body portion of the clip means. However, the hole or aperture has a substantially elliptical configuration due to the opposite bowed or arced portions of the spring clip means. Thus, the features of the present invention permit provision of a quick connection between a flexible shaft and instrument such as a speedometer means or other driven assembly having tapered mating surfaces and a unidirectional locking spring means. Purposes accomplished by features of this invention include obtaining a quick connect which can be established in a single thrust motion though properly aligned and resiliently maintaining a tight holding connection between components. Also the present invention has features assuring a condition of alignment during assembly of a cable termination to a speedometer driving portion such that the cable tip is protected against possible damage by bending during assembly, disassembly, handling, and the like. The telescopic interfit of tapered surfaces assures alignment regardless of where the mating pairs may fit tightly together due to their respective dimensions and regardless of their corresponding tolerances. The arced spring means having a central aperture or hole with a minor diameter less than the diameter of the mating housing component accomplishes a unidirectional lock regardless of longitudinal positioning of two telescopically fitting components or parts which may be assembled tightly to each other. The tapering surfaces of the mating components are adapted to engage each other prior to having the inner cable engage a mating axially recessed driven portion which can be squared where axially recessed for a positive interfit and driving connection. The components used in combination with each other can provide a minimum possible misalignment. Also, it is to be noted that the length of the portion 17 and outwardly extending end flange means 19 is such that the inner cable tip or end is protected thereby from damage which could be a result of severe cable tip bending during assembly, disassembly, handling and the like. The structural arrangement and cooperation of mating tapered surfaces held in position by clip means in accordance with the present invention prevents the possibility of misalignment at any time during assembly or disassembly of the flexible shaft or cable to a speedometer head or drive means such that the cable tip can be bent to the point of damaging it which is avoided by concentric location and length of the portion 17 and outwardly extending end flange means 19 as to the tapered end 11t of the cable tip.

In summary, advantages during assembly include among points previously noted that mating tapers prevent possibility of a misalignment between mating components. The clips 30 or 40 readily can be friction fitted into locking engagement to maintain interlock between mating components.

Furthermore, benefits during disassembly include easy access to the bowed portions 36 which can be displaced momentarily by pressure exerted against resilience thereof as engaged by suitable tool means or fingers which can accomplish nearly instantaneous release of spring retention when desired. Simultaneously, the mating tapers prevent misalignment at any time also during disassembly.

While the embodiments of the present invention as herein disclosed constitute preferred forms, it is to be understood that other forms might be adopted.

What is claimed is as follows:

In combination, a unitary washer-like spring clip means and vehicle speedometer assembly having flexible shaft quick connector components including concentric sleeve means having an inner driven portion with an axially recessed end thereof located radially inwardly of a tapered male housing end, a ferrule-like cable housing end portion having an outwardly extending end flange recessed radially inwardly in at least a pair of substantially opposite locations, said male housing end being positioned within said cable housing end portion, said clip means including substantially J-shaped axial projections integral therewith for external anchoring engagement with said outwardly extending end flange where recessed correspondingly thereto, and a centrally apertured substantially annular main body portion flexed centrally in substantially transversely opposite locations externally as well as laterally and axially accessible to provide a minor diameter of the aperture to have peripheral edging thereof tightly engageable for press fitted interlock with the tapered male housing end resiliently restricted internally as to possibtle misalignment as to each other yet subject to quick release only by temporary application of flattening pressure externally to said main body portion of said washer-like spring clip means for reduction of flex thereof to overcome and reduce resilient maintenance of minor diameter for release of interlock of components to each other regardless of relative longitudinal positioning therebetween though protected against damage by severe bending, handling, shipping and the like regardless of limited rear access space to the vehicle speedometer assembly.

References Cited by the Examiner

UNITED STATES PATENTS

| 1,324,787 | 12/19 | Berge | 64—4 |
| 2,245,751 | 6/41 | Blackmore | 85—8.8 |
| 2,372,987 | 4/45 | Shaver | 339—75 |
| 2,544,957 | 3/51 | Henry. | |
| 2,650,484 | 9/53 | Bujak | 287—119 |
| 2,925,289 | 2/60 | Brown. | |

FOREIGN PATENTS

| 315,163 | 9/17 | Germany. |

CARL W. TOMLIN, *Primary Examiner.*